(12) United States Patent
Wen et al.

(10) Patent No.: US 11,559,707 B2
(45) Date of Patent: Jan. 24, 2023

(54) OXYGEN CANDLE

(71) Applicant: SHAANXI STAR EXPLOSION SAFETY POLYTRON TECHNOLOGIES INC, Shaanxi (CN)

(72) Inventors: Xinguo Wen, Shaanxi (CN); Aiping Ma, Shaanxi (CN)

(73) Assignee: SHAANXI STAR EXPLOSION SAFETY POLYTRON TECHNOLOGIES INC, Shaanxi (CN)

( * ) Notice: Subject to any disclaimer, the term of this patent is extended or adjusted under 35 U.S.C. 154(b) by 437 days.

(21) Appl. No.: 16/763,931

(22) PCT Filed: Oct. 25, 2018

(86) PCT No.: PCT/CN2018/111901
§ 371 (c)(1),
(2) Date: May 13, 2020

(87) PCT Pub. No.: WO2019/128428
PCT Pub. Date: Jul. 4, 2019

(65) Prior Publication Data
US 2020/0368561 A1 Nov. 26, 2020

(30) Foreign Application Priority Data
Dec. 29, 2017 (CN) .......................... 201711478191.2

(51) Int. Cl.
*A62B 7/08* (2006.01)
*A62B 21/00* (2006.01)
*C01B 13/02* (2006.01)

(52) U.S. Cl.
CPC ................ *A62B 7/08* (2013.01); *A62B 21/00* (2013.01); *C01B 13/0296* (2013.01)

(58) Field of Classification Search
CPC ....... A62B 7/08; A62B 21/00; C01B 13/0296; C01B 13/0218; F24C 7/12; C06C 7/00; C06C 15/00
See application file for complete search history.

(56) References Cited

U.S. PATENT DOCUMENTS 4,246,229 A 1/1981 McBride et al.
4,623,520 A * 11/1986 Robinet .............. C01B 13/0296
422/126

(Continued)

FOREIGN PATENT DOCUMENTS

CN 1035248 A 9/1989
CN 105347308 A 2/2016

(Continued)

OTHER PUBLICATIONS

International Search Report (in English and Chinese) and Written Opinion of the International Searching Authority (in Chinese) issued in PCT/CN2018/111901, dated Jan. 21, 2019; ISA/CN.

*Primary Examiner* — Valerie L Woodward
(74) *Attorney, Agent, or Firm* — Harness, Dickey & Pierce, P.L.C.

(57) ABSTRACT

Provided is an oxygen candle starting device, comprising a pull line column (17) and a percussion cap (15), wherein a pull line hole (155) is provided in the pull line column in an axial direction of the pull line column, a percussion cap cavity (154) is provided inside one end of the pull line column, a fire-preventing cavity is provided inside the other end of the pull line column, and the pull line hole passes through the fire-preventing cavity and the percussion cap cavity; the percussion cap is mounted in the percussion cap cavity, and sand grains (16) are packaged in the fire-preventing cavity. Further provided is an oxygen candle comprising the oxygen candle starting device and an oxygen generator, wherein the oxygen generator comprises an agent loading housing, with a through hole being provided in the top of the agent loading housing, a gas outlet being provided in the bottom thereof, and a filter being mounted at the gas outlet; and the percussion cap of the oxygen candle starting device is in contact with an oxygen candle agent via the through hole, the oxygen generator is connected to the agent (Continued)

loading housing in a sealed manner, and the filter is connected to the gas outlet in a sealed manner. The oxygen candle employs a pull-type starting device, and the starting structure for an existing oxygen candle is simplified, thereby preventing a false start caused by the falling-off of a steel needle and improving the reliability.

10 Claims, 3 Drawing Sheets

(56) References Cited

U.S. PATENT DOCUMENTS

| | | | | |
|---|---|---|---|---|
| 5,198,147 | A * | 3/1993 | Zhang | C01B 13/0218 252/187.31 |
| 5,772,976 | A * | 6/1998 | Cortellucci | A62B 21/00 423/579 |
| 8,845,325 | B1 * | 9/2014 | Smith | A62B 21/00 431/153 |
| 2016/0194203 | A1 * | 7/2016 | Ernst | C01B 13/0218 422/600 |

FOREIGN PATENT DOCUMENTS

| | | |
|---|---|---|
| CN | 107892277 A | 4/2018 |
| CN | 207861890 U | 9/2018 |
| EP | 1146011 A2 | 10/2001 |
| JP | H08283004 A | 10/1996 |
| WO | WO-2009030921 A2 | 3/2009 |
| WO | WO-2016207649 A1 | 12/2016 |

* cited by examiner

OXYGEN CANDLE

CROSS REFERENCE TO RELATED APPLICATIONS

This application is a U.S. National Phase Application under 35 U.S.C. 371 of International Application No. PCT/CN2018/111901 filed on Oct. 25, 2018, which claims the benefit of priority from Japanese Patent Application No. 201711478191.2 filed Dec. 29, 2017. The entire disclosures of all of the above applications are incorporated herein by reference.

FIELD OF THE INVENTION

The present invention relates to the field of solid chemical oxygen self-rescuer apparatus technologies, and in particular, to an initial oxygen source starting device for a chemical oxygen self-rescuer, specifically, to an oxygen candle with a drawing-type starting device.

BACKGROUND OF THE INVENTION

In the existing oxygen generators, an oxygen candle is placed in a vessel provided with a gas outlet, and a mechanical starting device that can trigger the release of oxygen is provided on the upper part of the vessel. For the mechanical starting device, a percussion cap is impacted by means of mechanical strike, and the percussion cap generates a high temperature, which ignites the oxygen candle in the vessel, so that high-concentration oxygen is generated from above to the bottom. However, such a mechanical starting mode has the defects of complex mechanical structure, time-consuming assembling, high cost of percussion cap, easy falling-off of steel needle and generation of flame.

SUMMARY OF THE INVENTION

Directed to the defects or disadvantages of the prior art, the present invention provides an oxygen candle.

First of all, the invention provides an oxygen candle starting device, which includes a pull line column and a percussion cap, wherein a pull line hole is provided in the pull line column in an axial direction of the pull line column, a percussion cap cavity is provided inside one end of the pull line column, and a fire-preventing cavity is provided inside the other end of the pull line column, and the pull line hole passes through the fire-preventing cavity and the percussion cap cavity; the percussion cap is mounted in the percussion cap cavity, and sand grains are packaged in the fire-preventing cavity.

The percussion cap according to the invention includes a tension spring, which passes through the pull line hole.

The fire-preventing cavity according to the invention is packaged by a rubber plug, the rubber plug is mounted via a jack bolt, and the pull line hole passes through the rubber plug and the jack bolt.

The oxygen candle according to the invention includes an oxygen candle starting device and an oxygen generator, wherein the oxygen candle starting device is the oxygen candle starting device according to the invention, and the oxygen generator includes an agent loading housing, with a through hole being provided in the top of the agent loading housing, a gas outlet being provided in the bottom of the agent loading housing and a filter being mounted at the gas outlet; the percussion cap of the oxygen candle starting device is in contact with the oxygen candle agent via the through hole, the oxygen generator is connected to the agent loading housing in a sealed manner, and the filter is connected to the gas outlet in a sealed manner.

Further, an oxygen candle agent is loaded in the agent loading housing according to the invention, and a heat-insulating cotton is provided between the inner wall of the agent loading housing and the oxygen candle agent.

In some embodiments, the filter according to the invention includes a filter housing, with an air inlet being provided in the top of the filter housing, a gas outlet being provided in the bottom and a filter layer being provided in the filter housing, and the filter housing is connected to the agent loading housing in a sealed manner.

In some embodiments, the filter housing according to the invention includes an upper cover and a lower housing, wherein an air inlet is provided in the upper cover, and a gas outlet is provided in the bottom of the lower housing.

In further embodiments, a moisture-proof cotton is provided between the upper cover and the filter layer according to the invention, and a moisture-proof cotton is provided between the filter layer and the bottom of the lower housing.

In some embodiments, a carrier plate web is provided between the upper cover and the oxygen generator according to the invention, the carrier plate web is provided with a vent hole, and the carrier plate web is provided with a convex part.

In a preferred embodiment, an oxygen candle agent is loaded in the agent loading housing according to the invention, wherein the oxygen candle agent includes an absorbing inflammable layer, a heating layer and a main candle layer, and the heating layer is provided between the absorbing inflammable layer and the main candle layer.

The main candle layer is made of, in mass percentage, 90%~96% chlorate, 1.5%~5% catalyst, 0~3% fuel, 1.5%~2.5% bonding agent and 0.5%~1.5% stabilizing agent; the heating layer is made of, in mass percentage, 70%~80% chlorate, 5%~15% catalyst, 5%~12% fuel and 3.0%~6.0% bonding agent; the absorbing inflammable layer is made of, in mass percentage, 5%~15% fuel, 80%~90% barium chromate, 3%~5% bonding agent and 0~1% chlorate; the catalyst is a combination of more than two of cobalt oxide, $MnO_2$ and titanium oxide; the main candle layer has a catalyst dosage that is 4~5 times of that of the heating layer; the fuel is a mixture of one or more of magnesium powder, titanium powder, cobalt powder and zirconium powder; the chlorate is sodium chlorate or potassium chlorate; the bonding agent is a combination of one or more of kaolin, glass fiber, ceramic fiber and diatomite; and the stabilizing agent is a combination of one or more of potassium perchlorate, sodium perchlorate and micro silicon powder.

In comparison with the prior art, the invention has the advantages below.

The oxygen candle of the invention employs a drawing-type oxygen candle device, and the mechanical starting structure of the existing oxygen candle is simplified, thereby preventing a false start caused by the falling-off of a steel needle and improving the reliability.

The oxygen candle of the invention employs a percussion cap that is ignited via frictional heating, thus the cost of the oxygen candle oxygen generator may be lowered.

For the oxygen candle of the invention, fire-preventing sand and a rubber plug are provided above the percussion cap, which can play the role of heat damping and prevent heat dissipation and post torching, etc., during the ignition of the oxygen candle.

The oxygen candle of the invention employs a drawing-type structure, and the reliability and safety of the drop and roll experiments on the oxygen candle may be improved by adjusting the number of turns of the tension spring and shortening the ignition time.

A carrier plate web is placed between the oxygen candle main body and the filter layer according to the invention. When oxygen is generated by the oxygen candle, the oxygen flow resistance may be effectively lowered, thereby guaranteeing an oxygen quantity required by emergency rescue.

The invention employs a heat-insulating material, so that heat loss may be reduced, and the housing temperature of the oxygen candle may be greatly lowered.

The oxygen candle agent according to the invention is compounded using a high-efficiency catalyst. The chlorate can be continuously decomposed at a low temperature according to the activation energy temperature of different catalysts. At the same time, the $MnO_2$ in the formulation can improve the oxygen purity. No antichlor exists in the formulation of the oxygen candle, and the cost may be lowered. At the same time, the structure of the oxygen candle consists of three layers, and the starting reliability of the oxygen candle can be improved. The inflammable layer consists of flaking metal powder and a barium salt, so that harmful gases such as nitrogen oxide and carbon dioxide can be effectively absorbed, thereby improving the oxygen purity.

DETAILED DESCRIPTION OF THE EMBODIMENTS

Figure 1:
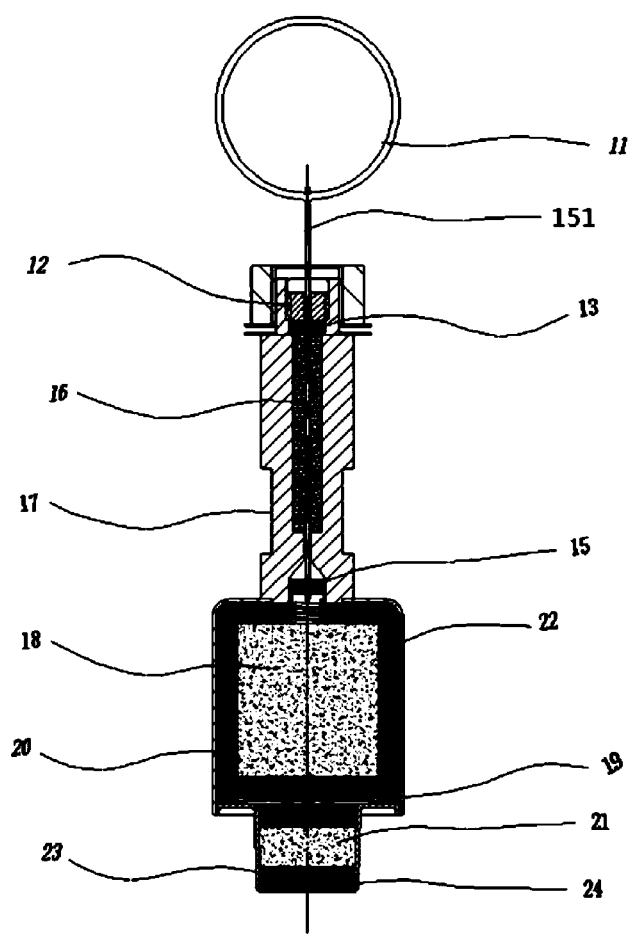
FIG. 1 is a structural representation of an oxygen candle according to the invention.

The percussion cap of the invention may employ percussion cap with a column structure (for example, a cylinder). For example, in the structure diagram of the percussion cap shown in FIG. 2, the percussion cap consists of a percussion cap housing 153, a percussion cap agent 152 and a tension spring 151. The percussion cap housing 153 is a cylindrical housing for protecting the percussion cap agent 152, with the upper bottom face being provided with a small hole and the lower bottom face being opened. The percussion cap housing 153 is placed in a percussion cap cavity 154 of the pull line column. The tension spring 151 passes through the percussion cap agent 152 and a pull line hole 155. The percussion cap cavity 154 is a cylindrical cavity similar to the percussion cap housing 153. The pull line hole 155 is a hole the same as that on the upper bottom face of the percussion cap housing 153, which can be adapted for the smooth pull-out of the tension spring. Under the action of an external force, friction is generated between the tension spring and the percussion cap agent at the moment the tension spring is pulled straight, so that the percussion cap is ignited.

The tension spring 151 of the invention passes through the fire-preventing sand. When the percussion cap is ignited, the fire-preventing sand plays the role of heat damping and prevents post torching. Further, the rubber plug blocks the gas from escaping. The material of the rubber plug may be one selected from butyronitrile rubber, chloroprene rubber, styrene butadiene rubber and fluororubber.

The heat-insulating cotton of the invention may employ a silicon dioxide aerogel heat-insulating cotton for reducing heat loss, and the housing temperature of the oxygen candle may be greatly lowered.

The carrier plate web between the oxygen candle agent and the filter layer of the invention lowers the oxygen flow resistance. Stainless steel may be selected as the material of the carrier plate web, mainly for lowering the airflow resistance.

The filter layer of the invention may employ a hybrid-type filter layer, which may consist of a catalyst and an alkali metal peroxide (for example, sodium peroxide). A filter material prepared by a heating and grinding hybrid process can effectively absorb harmful gases such as CO and $CO_2$, etc.

The technical solutions in the embodiments of the invention will be described clearly and fully below in conjunction with the drawings in the embodiments of the invention. Apparently, the embodiments described are only a part of the embodiments of the invention, rather than being the whole embodiments. All the other embodiments obtained by one of ordinary skills in the art based on the embodiments of the invention without creative work pertain to the protection scope of the invention.

Embodiment 1

Figure 2:
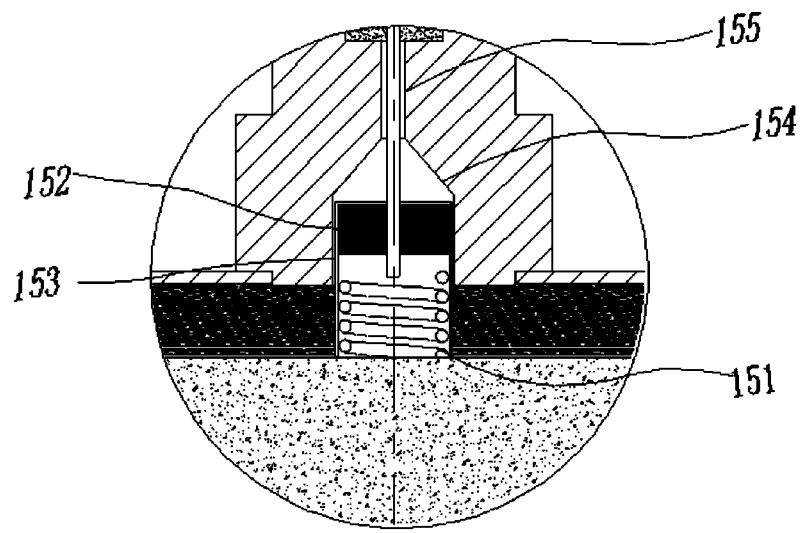
FIG. 2 is a partly enlarged view of a percussion cap according to one embodiment of the invention.

As shown in FIG. 1 and FIG. 2, the oxygen candle starting device of this embodiment includes a pull line column 17 and a percussion cap 15, wherein a pull line hole 155 is provided in the pull line column in an axial direction of the pull line column, a percussion cap cavity 154 is provided inside one end of the pull line column 17, and a fire-preventing cavity is provided inside the other end of the pull line column, and the pull line hole passes through the fire-preventing cavity and the percussion cap cavity. The percussion cap 15 is mounted in the percussion cap cavity, and fire-preventing sand 16 is packaged in the fire-preventing cavity.

The percussion cap consists of a percussion cap housing 153, a percussion cap agent 152 and a tension spring 151. The percussion cap housing 153 is a cylindrical housing for protecting the percussion cap agent 152, with the upper bottom face being provided with a small hole and the lower bottom face being opened. The percussion cap housing 153 is placed in the percussion cap cavity 154 of the pull line column, and the tension spring 151 passes through the percussion cap agent 152 and the pull line hole 155. The percussion cap cavity 154 is a cylindrical cavity similar to the percussion cap housing 153. The pull line hole 155 is a hole the same as that on the upper bottom face of the percussion cap housing 153, which can be adapted for the smooth pull-out of the tension spring.

For easy operation, in some embodiments, a circular handle 11 is provided at the end part of the tension spring.

In some specific embodiments, the fire-preventing cavity is packaged by a rubber plug 13, and the rubber plug is mounted via a jack bolt 12, wherein the pull line hole passes through the rubber plug and the jack bolt.

For the selection of the parameters, the specific dimensions of the percussion cap may be selected as follows: a copper cylinder having a diameter $D=5\pm0.01$ mm, with the upper bottom face being opened and the lower bottom face being provided with a small hole of 0.5±0.01 mm in diameter; the percussion cap agent is loaded on the lower bottom face of the percussion cap housing, and a small hole with the same size as that of the lower bottom face is provided. Optionally, the tension spring has a diameter of 5 mm, the wire diameter d=0.5±0.01 mm, and one end of thereof is connected to a pulling ring, and the other end thereof is wound by 3~5 turns. The material of the tension spring is one selected from copper wire or iron wire.

Embodiment 2

As shown in FIG. 1, the oxygen candle of this embodiment includes an oxygen candle starting device, an oxygen generator and a filter.

The oxygen generator is mounted below the oxygen candle starting device, and they are connected in a sealed manner. The filter is mounted below the oxygen generator, and similarly, they are connected in a sealed manner.

The oxygen generator includes an agent loading housing 22, wherein a through hole is provided in the top of the agent loading housing 22, a gas outlet is provided in the bottom of the agent loading housing 22, and a filter is mounted at the gas outlet. The percussion cap of the oxygen candle starting device is in contact with the oxygen candle agent via the through hole. The pull line column of the oxygen candle starting device is connected to the agent loading housing in a sealed manner, and the filter is connected with all the gas outlets in a sealed manner. The bottom of the pull line column may be welded to the agent loading housing to achieve a sealing effect.

In some more specific embodiments, an oxygen candle agent 18 is mounted inside the agent loading housing, and a heat-insulating cotton 20 is provided between the inner wall of the agent loading housing and the oxygen candle agent.

The filter of this embodiment includes a filter housing 23, with an air inlet being provided in the top of the filter housing, a gas outlet 24 being provided in the bottom thereof and a filter layer 21 being mounted in the filter housing, wherein the filter housing and the agent loading housing are connected in a sealed manner.

In use, the tension spring 151 in FIG. 1 of the invention is pulled out via the pulling ring. Friction is generated between the tension spring and the percussion cap agent, and the heat generated ignites the agent. Heat damping is performed by the fire-preventing sand on the high-energy flame generated momentarily, and the oxygen candle body is ignited to release high-concentration oxygen.

Figure 3:
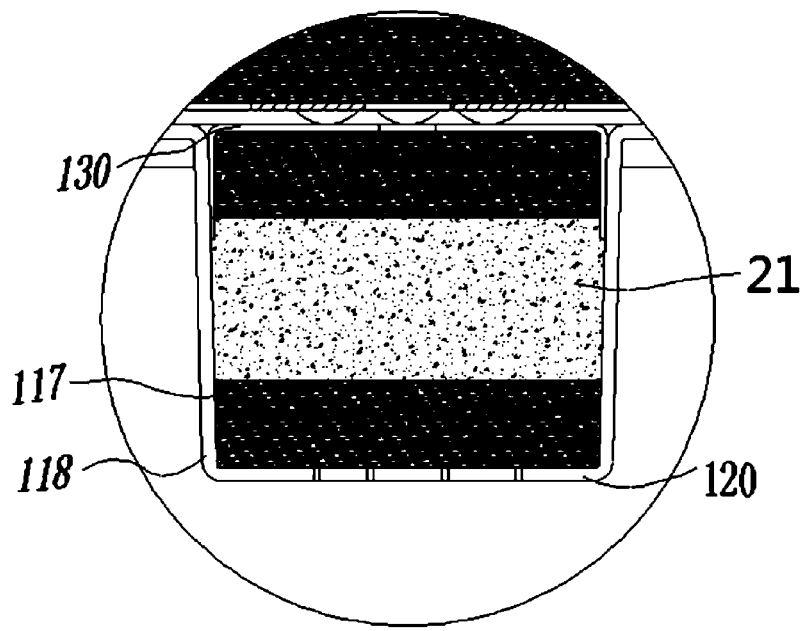
FIG. 3 is a structural representation of a filter according to one embodiment of the invention.
Figure 4:
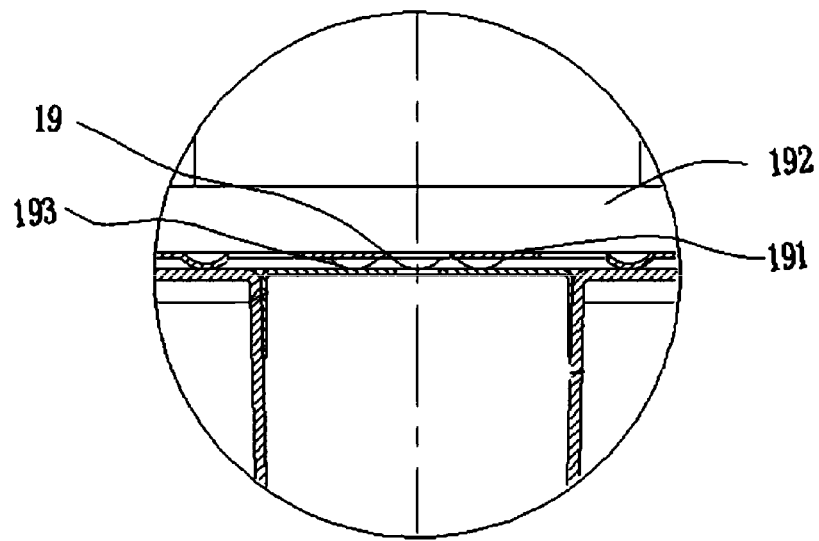
FIG. 4 is an enlarged view of the structure between the oxygen generator and the filter.
Figure 5:
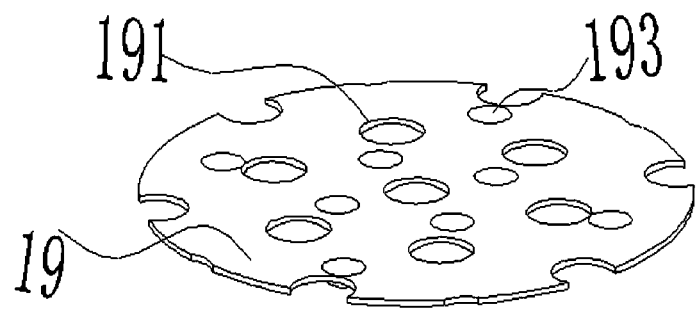
FIG. 5 is an enlarged view of the structure of the carrier plate in FIG. 4.

In some embodiments, as shown in FIG. 3, the filter housing 23 includes an upper cover 130 and a lower housing 118. The upper cover is provided with an air inlet, and the bottom of the lower housing is provided with a gas outlet 24. In a preferred solution, as shown in FIG. 4, a moisture-proof cotton 117 is provided between the upper cover 130 and the filter layer 21, and a moisture-proof cotton is provided between the filter layer and the bottom of the lower housing. In a more preferred solution, as shown in FIG. 4 and FIG. 5, a carrier plate web 19 is provided between the upper cover 130 and the oxygen generator. Vent holes 191 are provided on the carrier plate web 19, and the carrier plate web is provided with convex parts 193. In a more preferred solution, a heat-insulating cotton 192 may be provided between the carrier plate web 19 and the oxygen generator.

The high-concentration oxygen momentarily generated by the oxygen candle passes through the carrier plate web, as shown in FIG. 4, whereby the resistance on the gas flowing to the filter layer is effectively lowered. The momentarily generated high-concentration oxygen passes through the heat-insulating cotton 192, then passes through the carrier plate web 19 having holes 191 and convex parts 193, and enters the filter layer along the upper cover 130 of the filter layer. The harmful gas components contained in the gas is absorbed by the filter layer, and oxygen is released along the gas outlet.

According to an experiment on the embodiment of the invention, the oxygen candle with a drawing-type structure meets the standard of AQ-1057s.

Specific experiment results:

| detection item | detection method | detection result | standard |
| --- | --- | --- | --- |
| starting force | spring tension machine | 40N | AQ-1057 |
| trigger rate | group experiment all started | 100% | AQ-1057 |
| drop performance | fall from height of 3 m | intact structure no oxygen released spontaneously | AQ-1057 |
| rolling experiment | rolling impact test chamber | intact structure no oxygen released spontaneously | AQ-1057 |
| air tightness | U-type pressure gauge under 1 Kpa, pressure drop within 1 min no greater than 30 Pa | 15 Pa | AQ-1057 |

Embodiment 3

The absorbing inflammable layer has a total weight of 10 g, and the ratio of each component (mass percentage) is as follows: chlorate 0.2%, magnesium powder 10%, barium chromate 85% and kaolin 4.8%.

The heating body layer has a total weight of 52.1 g, with a ratio (mass percentage) of: sodium chlorate 73%, cobaltosic oxide 4%, manganese dioxide 6%, iron powder 5%, cobalt powder 7% and kaolin 5%.

The main candle layer has a total weight of 300.05 g, with a ratio (mass percentage) of: sodium chlorate 95%, potassium perchlorate 0.5%, cobaltosic oxide 0.7%, manganese dioxide 0.8%, cobalt powder 1.0% and kaolin 2.0%. First of all, the chlorate is dried at 120° C. in an infrared oven for 30-60 min and then agitated and mixed uniformity with other weighed materials by a ball mill and a double worm mixer, a certain amount of $NaCrO_4$ aqueous solution with a concentration of 0.5~2% is added and mixed fully, and an oxygen-generating block with φ=20 mm and H=23 mm is prepared by moulding and demoulding and then dried at 120° C. in an infrared drying oven for 1 h.

Experiment Result: the oxygen candle can be normally started, the catalyst is compounded by $Co_3O_4/MnO_2$, the oxygen candle combusts stably without flowing, and it is detected that each performance index meets the standard of AQ-1057.

| detection item | detection method | detection result | standard |
| --- | --- | --- | --- |
| oxygen release | wet flowmeter | 6.0 L | AQ-1057 |
| oxygen purity | multi-component gas infrared analyzer | >95% | — |
| oxygen release in the first 30 s | wet flowmeter | 2.3 L | AQ-1057 |

-continued

| detection item | detection method | detection result | standard |
|---|---|---|---|
| oxygen release in the first 50 s | wet flowmeter | 4.9 L | AQ-1057 |
| nitrogen oxide | nitrogen oxide detecting tube | 0 ppm | AQ-1057 |
| carbon monoxide | carbon monoxide detecting tube | 79 ppm | AQ-1057 |
| chlorine | chlorine detecting tube | 0 ppm | AQ-1057 |
| carbon dioxide | $CO_2$ infrared analyzer | 0.16% (v/v) | AQ-1057 |
| −20° C./60° C. housing temperature | — thermometer | started normally 125° C. | AQ-1057 AQ-1057 |
| reaction temperature | temperature recorder | 195.4° C. | — |
| effective oxygen release/weight ratio | — | 41.5% | — |

Embodiment 4

The absorbing inflammable layer has a total weight of 15 g, with a ratio (mass percentage) of: chlorate 0.5%, magnesium powder 10%, barium chromate 84.5% and kaolin 5%;

The heating body layer has a total weight of 59.12 g, with a ratio (mass percentage) of: sodium chlorate 76%, cobaltosic oxide 5%, manganese dioxide 5%, iron powder 3%, cobalt powder 6% and kaolin 5%.

The main candle layer has a total weight of 285 g, with a ratio (mass percentage) of: sodium chlorate 95.5%, potassium perchlorate 0.7%, cobaltosic oxide 0.7%, manganese dioxide 0.9%, cobalt powder 0.5% and kaolin 1.7%. First of all, the chlorate is dried at 120° C. in an infrared oven for 30~60 min and then agitated and mixed uniformity with other weighed materials by a ball mill and a double worm mixer, a certain amount of $NaCrO_4$ aqueous solution with a concentration of 0.5~2% is added and mixed fully, and an oxygen-generating block with $\varphi=20$ mm and H=23 mm is prepared by moulding and demoulding and then dried at 120° C. in an infrared drying oven for 1 h.

Experiment Result: the oxygen candle can be normally started, the catalyst is compounded by $Co_3O_4/MnO_2$, the oxygen candle combusts stably without flowing, and it is detected that each performance index meets the standard of AQ-1057.

| detection item | detection method | detection result | standard |
|---|---|---|---|
| oxygen release | wet flowmeter | 5.9 L | AQ-1057 |
| oxygen purity | multi-component gas infrared analyzer | >95% | — |
| oxygen release in the first 30 s | wet flowmeter | 2.4 L | AQ-1057 |
| oxygen release in the first 50 s | wet flowmeter | 5.0 L | AQ-1057 |
| nitrogen oxide | nitrogen oxide detecting tube | 0 ppm | AQ-1057 |
| carbon monoxide | carbon monoxide detecting tube | 76 ppm | AQ-1057 |
| chlorine | chlorine detecting tube | 0 ppm | AQ-1057 |
| carbon dioxide | $CO_2$ infrared analyzer | 0.14% (v/v) | AQ-1057 |
| −20° C./60° C. housing temperature | — thermometer | started normally 130° C. | AQ-1057 AQ-1057 |
| reaction temperature | temperature recorder | 200.1° C. | — |
| effective oxygen release/weight ratio | — | 39% | — |

Embodiment 5

The absorbing inflammable layer has a total weight of 10 g, with a ratio (mass percentage) of: zirconium powder 8%, barium chromate 83% and kaolin 9%;

The heating body layer has a total weight of 48.5 g, with a ratio (mass percentage) of: sodium chlorate 77%, cobaltosic oxide 6%, manganese dioxide 5.5%, iron powder 4%, magnesium powder 2.5% and kaolin 5%.

The main candle layer has a total weight of 300.01 g, with a ratio (mass percentage) of: sodium chlorate 94.4%, potassium perchlorate 1.0%, cobaltosic oxide 0.9%, manganese dioxide 1.2%, magnesium powder 1.0% and kaolin 1.4%. First of all, the chlorate is dried at 120° C. in an infrared oven for 30~60 min and then agitated and mixed uniformity with other weighed materials by a ball mill and a double worm mixer, a certain amount of $NaCrO_4$ aqueous solution with a concentration of 0.5~2% is add and mixed fully, and an oxygen-generating block with $\varphi=20$ mm and H=23 mm is prepared by moulding and demoulding and then dried at 120° C. in an infrared drying oven for 1 h.

Experiment Result: the oxygen candle can be normally started, the catalyst is compounded by $Co_3O_4/MnO_2$, the oxygen candle combusts stably without flowing, and it is detected that each performance index meets the standard of AQ-1057.

| detection item | detection method | detection result | standard |
|---|---|---|---|
| oxygen release | wet flowmeter | 5.9 L | AQ-1057 |
| oxygen purity | multi-component gas infrared analyzer | >95% | — |
| oxygen release in the first 30 s | wet flowmeter | 2.1 L | AQ-1057 |
| oxygen release in the first 50 s | wet flowmeter | 3.5 L | AQ-1057 |
| nitrogen oxide | nitrogen oxide detecting tube | 0 ppm | AQ-1057 |
| carbon monoxide | carbon monoxide detecting tube | 77 ppm | AQ-1057 |
| chlorine | chlorine detecting tube | 0 ppm | AQ-1057 |
| carbon dioxide | $CO_2$ infrared analyzer | 0.15% (v/v) | AQ-1057 |
| −20° C./60° C. housing temperature | — thermometer | started normally 120° C. | AQ-1057 AQ-1057 |
| reaction temperature | temperature recorder | 194.8° C. | — |
| effective oxygen release/weight ratio | — | 41% | — |

Embodiment 6

The ratio of each component in the absorbing inflammable layer is the same as that of Embodiment 3.

The ratio of each component in the heating body layer is the same as that of Embodiment 1.

The main candle layer has a total weight of 295 g, with a ratio (mass percentage) of: sodium chlorate 93.5%, potassium perchlorate 1.5%, cobaltosic oxide 1.1%, manganese dioxide 1.3%, magnesium powder 1.1% and kaolin 1.5%. First of all, the chlorate is dried at 120° C. in an infrared oven for 30~60 min and then agitated and mixed uniformity with other weighed materials by a ball mill and a double worm mixer, a certain amount of $NaCrO_4$ aqueous solution with a concentration of 0.5~2% is add and mixed fully, and an oxygen-generating block with $\varphi=20$ mm and H=23 mm is prepared by moulding and demoulding and then dried at 120° C. in an infrared drying oven for 1 h.

Experiment Result: the oxygen candle can be normally started, the catalyst is compounded by $Co_3O_4/MnO_2$, the oxygen candle combusts stably without flowing, and it is detected that each performance index meets the standard of AQ-1057.

| detection item | detection method | detection result | standard |
|---|---|---|---|
| oxygen release | wet flowmeter | 5.6 L | AQ-1057 |
| oxygen purity | multi-component gas infrared analyzer | >95% | — |
| oxygen release in the first 30 s | wet flowmeter | 2.1 L | AQ-1057 |
| oxygen release in the first 50 s | wet flowmeter | 3.9 L | AQ-1057 |
| nitrogen oxide | nitrogen oxide detecting tube | 0 ppm | AQ-1057 |
| carbon monoxide | carbon monoxide detecting tube | 63 ppm | AQ-1057 |
| chlorine | chlorine detecting tube | 0 ppm | AQ-1057 |
| carbon dioxide | $CO_2$ infrared analyzer | 0.20% (v/v) | AQ-1057 |
| −20° C./60° C. housing temperature reaction temperature | — thermometer temperature recorder | started normally 126° C. 196.6° C. | AQ-1057 AQ-1057 — |
| effective oxygen release/weight ratio | — | 40% | — |

Embodiment 7

The ratio of each component in the absorbing inflammable layer is the same as that of Embodiment 2.

The ratio of each component in the heating body layer is the same as that of Embodiment 3.

The main candle layer has a total weight of 320 g, with a ratio (mass percentage) of: sodium chlorate 92.6%, potassium perchlorate 1.2%, cobaltosic oxide 1.0%, manganese dioxide 1.5%, cobalt powder 1.5%, magnesium powder 1.0% and kaolin 2.2%. First of all, the chlorate is dried at 120° C. in an infrared oven for 30~60 min and then agitated and mixed uniformity with other weighed materials by a ball mill and a double worm mixer, a certain amount of $NaCrO_4$ aqueous solution with a concentration of 0.5~2% is add and mixed fully, and an oxygen-generating block with φ=20 mm and H=23 mm is prepared by moulding and demoulding and then dried at 120° C. in an infrared drying oven for 1 h.

Experiment Result: the oxygen candle can be normally started, the catalyst is compounded by $Co_3O_4/MnO_2$, the oxygen candle combusts stably without flowing, and it is detected that each performance index meets the standard of AQ-1057.

| detection item | detection method | detection result | standard |
|---|---|---|---|
| oxygen release | wet flowmeter | 5.8 L | AQ-1057 |
| oxygen purity | multi-component gas infrared analyzer | >95% | — |
| oxygen release in the first 30 s | wet flowmeter | 2.2 L | AQ-1057 |
| oxygen release in the first 50 s | wet flowmeter | 3.6 L | AQ-1057 |
| nitrogen oxide | nitrogen oxide detecting tube | 0 ppm | AQ-1057 |
| carbon monoxide | carbon monoxide detecting tube | 70 ppm | AQ-1057 |
| chlorine | chlorine detecting tube | 0 ppm | AQ-1057 |
| carbon dioxide | $CO_2$ infrared analyzer | 0.15% (v/v) | AQ-1057 |
| −20° C./60° C. housing temperature reaction temperature | — thermometer temperature recorder | started normally 118° C. 195.9° C. | AQ-1057 AQ-1057 — |
| effective oxygen release/weight ratio | — | 39.5% | — |

The above formulation examples 1, 2, 3, 4, 5 are prepared in the process below.

First of all, a certain amount of main candle body is added to the lower part of the cavity of a forming mould; next, a heating body layer well mixed is added for prepressing; then, the components of an inflammable layer is added for shaping and demoulding. The oxygen candle as formed is placed into a baking oven at a constant temperature of 120° C. for 30 min, and an intact oxygen-generating device is equipped, then the oxygen-generating device is placed at a constant temperature of −20° C., 25° C. and 60° C. for 2 h respectively to detect whether the oxygen candle can be started successfully.

The oxygen-generating agent in the oxygen candle according to the invention has a decomposition temperature lower than 200° C., and the temperature rise of the housing is less than 130° C. According to the oxygen release and the change of the oxygen candle before and after combustion, the effective oxygen release/weight ratio is 39%-41%.

The above embodiments will not limit the scope of the invention, and any modification, equivalent substitution and improvement made within the principles of the above embodiments without creative work will pertain to the protection scope of the invention.

What is claimed is:

1. An oxygen candle starting device, comprising a pull line column and a percussion cap, wherein a pull line hole is provided in the pull line column in an axial direction of the pull line column, a percussion cap cavity is provided inside one end of the pull line column, and a fire-preventing cavity is provided inside the other end of the pull line column, the pull line hole passes through the fire-preventing cavity and the percussion cap cavity; the percussion cap is mounted in the percussion cap cavity, and sand grains are packaged in the fire-preventing cavity.

2. The oxygen candle starting device according to claim 1, wherein the percussion cap comprises a tension spring, which passes through the pull line hole.

3. The oxygen candle starting device according to claim 1, wherein the fire-preventing cavity is packaged by a rubber plug, the rubber plug is mounted via a jack bolt, and the pull line hole passes through the rubber plug and the jack bolt.

4. An oxygen candle, comprising an oxygen candle starting device and an oxygen generator, wherein the oxygen candle starting device is the oxygen candle starting device according to claim 1 wherein the oxygen generator comprises an agent loading housing, with a through hole being provided in the top of the agent loading housing, a gas outlet being provided in the bottom of the agent loading housing, and a filter being mounted at the gas outlet; the percussion cap of the oxygen candle starting device is in contact with the oxygen candle agent via the through hole, the oxygen generator is connected to the agent loading housing in a sealed manner, and the filter is connected to the gas outlet in a sealed manner.

5. The oxygen candle according to claim 4, wherein the oxygen candle agent is loaded in the agent loading housing, and a heat-insulating cotton is provided between the inner wall of the agent loading housing and the oxygen candle agent.

6. The oxygen candle according to claim 4, wherein the filter comprises a filter housing, with an air inlet being provided in the top of the filter housing, a gas outlet being provided on the bottom and a filter layer being mounted in the filter housing, and the filter housing is connected to the agent loading housing in a sealed manner.

7. The oxygen candle according to claim 4, wherein the filter housing comprises an upper cover and a lower housing, wherein an air inlet is provided in the upper cover, and a gas outlet is provided in the bottom of the lower housing.

8. The oxygen candle according to claim 7, wherein a moisture-proof cotton is provided between the upper cover and the filter layer, and a moisture-proof cotton is provided between the filter layer and the bottom of the lower housing.

9. The oxygen candle according to claim 7, wherein a carrier plate web is provided between the upper cover and the oxygen generator, wherein the carrier plate web is provided with vent holes and convex parts.

10. The oxygen candle according to claim 4, wherein the oxygen candle agent is loaded in the agent loading housing, and the oxygen candle agent comprises an absorbing inflammable layer, a heating layer and a main candle layer, wherein the heating layer is provided between the absorbing inflammable layer and the main candle layer;

the main candle layer is made of, in mass percentage, 90%~96% chlorate, 1.5%~5% catalyst, 0~3% fuel, 1.5%~2.5% bonding agent and 0.5%~1.5% stabilizing agent;

the heating layer is made of, in mass percentage, 70%~80% chlorate, 5%~15% catalyst, 5%~12% fuel and 3.0%~6.0% bonding agent;

the absorbing inflammable layer is made of, in mass percentage, 5%~15% fuel, 80%~90% barium chromate, 3%~5% bonding agent and 0~1% chlorate;

the catalyst is a combination of more than two of cobalt oxide, $MnO_2$ and titanium oxide, and the main candle layer has a catalyst dosage that is 4~5 times of that of the heating layer;

the fuel is a mixture of one or more of magnesium powder, titanium powder, cobalt powder and zirconium powder;

the chlorate is sodium chlorate or potassium chlorate;

the bonding agent is a combination of one or more of kaolin, glass fiber, ceramic fiber and diatomite; and the stabilizing agent is a combination of one or more of potassium perchlorate, sodium perchlorate and micro silicon powder.

\* \* \* \* \*